US010250100B2

(12) United States Patent
Bradfield

(10) Patent No.: US 10,250,100 B2
(45) Date of Patent: Apr. 2, 2019

(54) ENGINE STARTER SYSTEM

(71) Applicant: BorgWarner, Inc., Auburn Hills, MI (US)

(72) Inventor: Michael D. Bradfield, Anderson, IN (US)

(73) Assignees: REMY TECHNOLOGIES, L.L.C., Pendleton, IN (US); REMY POWER PRODUCTS, L.L.C., Pendleton, IN (US)

(*) Notice: Subject to any disclaimer, the term of this patent is extended or adjusted under 35 U.S.C. 154(b) by 462 days.

(21) Appl. No.: 13/837,102

(22) Filed: Mar. 15, 2013

(65) Prior Publication Data

US 2014/0265679 A1    Sep. 18, 2014

(51) Int. Cl.
| H02K 7/116 | (2006.01) |
| F02N 11/08 | (2006.01) |
| H02K 21/04 | (2006.01) |
| F02N 15/06 | (2006.01) |
| H02K 1/17  | (2006.01) |

(52) U.S. Cl.
CPC .......... *H02K 7/116* (2013.01); *F02N 11/0844* (2013.01); *F02N 15/067* (2013.01); *H02K 21/042* (2013.01); *F02N 2011/0892* (2013.01); *F02N 2200/022* (2013.01); *H02K 1/17* (2013.01); *Y02T 10/48* (2013.01)

(58) Field of Classification Search
CPC ............. H02K 1/00; H02K 25/00; H02P 6/08
USPC .......... 310/49.28, 49.46, 83, 154.02, 154.03, 310/154.11, 154.36, 155, 181, 154.01, 310/154.08, 154.26, 154.45, 156.46; 318/701
See application file for complete search history.

(56) References Cited

U.S. PATENT DOCUMENTS

| 2,482,875 A | * | 9/1949 | Sawyer | H02K 23/02 |
| | | | | 310/154.02 |
| 3,201,625 A | * | 8/1965 | Smith | H02K 23/02 |
| | | | | 210/181 |
| 4,181,875 A | * | 1/1980 | Kohzai | H02K 23/02 |
| | | | | 310/181 |

(Continued)

FOREIGN PATENT DOCUMENTS

EP    0615331    *  9/1994  ............. H02K 7/106

OTHER PUBLICATIONS

Wikipedia; Magentic reluctance; https://en.wikipedia.org/wiki/Magnetic_reluctance; Wikimedia Foundation; 3 pages; Aug. 22, 2017.

(Continued)

*Primary Examiner* — Burton S Mullins
(74) *Attorney, Agent, or Firm* — Cantor Colburn LLP

(57) ABSTRACT

Embodiments of the invention provide a starter that includes a motor with an armature that is coupled to a pinion. In some embodiments, the starter can include a main field coil that can be configured and arranged to produce a main magnetic field flux. Some embodiments include at least one auxiliary flux assembly arranged in close proximity with the main field coil and electrically disconnected from it. In some embodiments, a control system can operatively power the main field coil to produce a magnetic field flux. In some embodiments, the at least one auxiliary flux assembly can provide a supplementary field flux adding to the main magnetic field flux that interacts with the armature.

25 Claims, 12 Drawing Sheets

(56) References Cited

U.S. PATENT DOCUMENTS

| | | | | |
|---|---|---|---|---|
| 4,488,073 | A * | 12/1984 | Morishita | H02K 7/116 |
| | | | | 310/154.13 |
| 4,621,197 | A * | 11/1986 | Tanaka | 290/38 R |
| 4,673,852 | A * | 6/1987 | Geiger | 388/823 |
| 4,988,055 | A * | 1/1991 | Sakai | H01F 5/02 |
| | | | | 242/159 |
| 5,013,411 | A * | 5/1991 | Minowa | H01F 1/0577 |
| | | | | 148/102 |
| 6,756,870 | B2 * | 6/2004 | Kuwahara | 335/224 |
| 7,977,841 | B2 * | 7/2011 | Yang | H02K 1/02 |
| | | | | 310/181 |
| 2009/0121557 | A1 * | 5/2009 | Yang | 310/12 |
| 2010/0176677 | A1 * | 7/2010 | Labbe | H02K 1/17 |
| | | | | 310/154.29 |
| 2011/0260672 | A1 * | 10/2011 | Ramu | 318/701 |
| 2012/0256624 | A1 * | 10/2012 | Takewaki et al. | 324/307 |

OTHER PUBLICATIONS

Wikipedia; Neodymium magnet; https://en.wikipedia.org/wiki/Neodymium__magnet; Wikimedia Foundation; 8 pages; Sep. 4, 2017.

The Engineering ToolBox; Permeability; http://www.engineeringtoolbox.com/permeability-d_1923.html; 2 pages; Sep. 18, 2017.

Wikipedia; Electric steel; https://en.wikipedia.org/wiki/Electrical_steel; Wikimedia Foundation; 5 pages; Aug. 29, 2017.

* cited by examiner

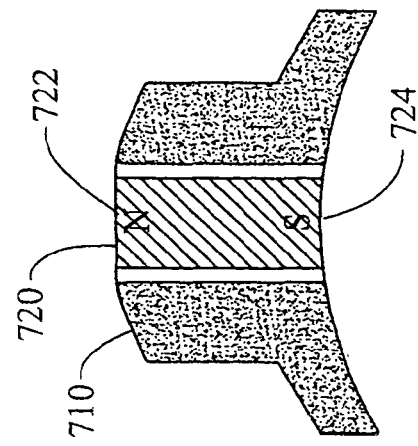
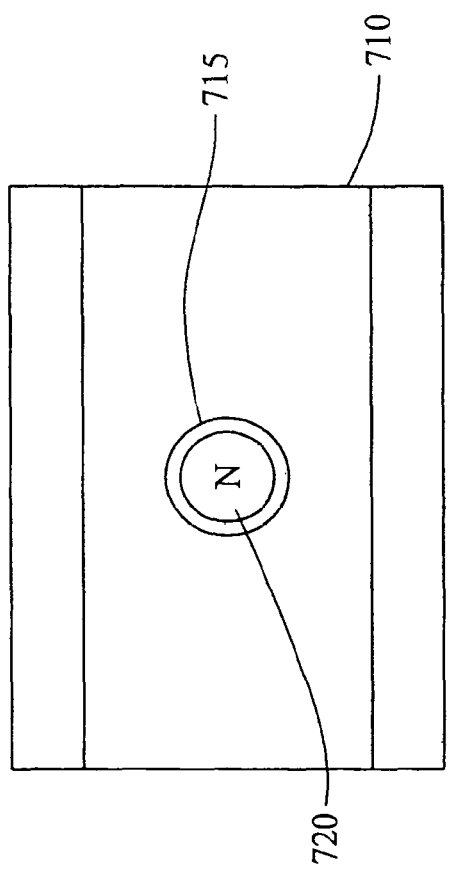
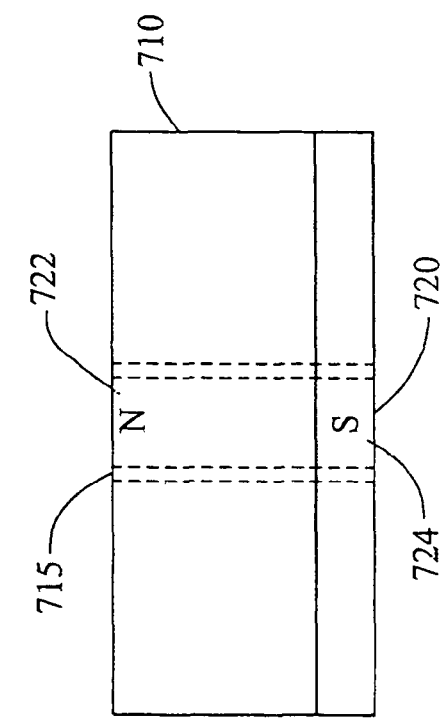

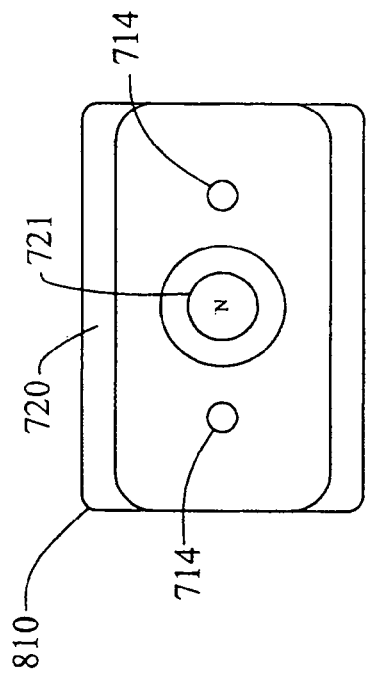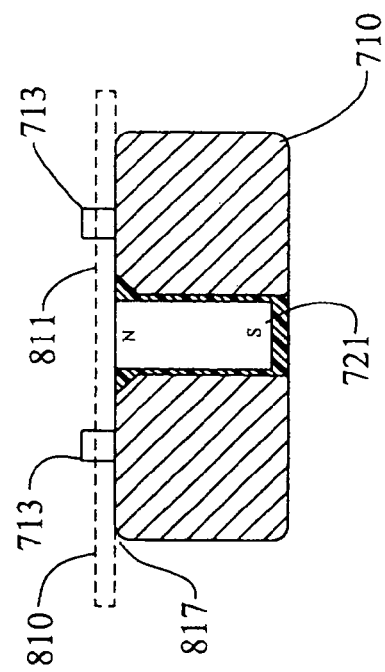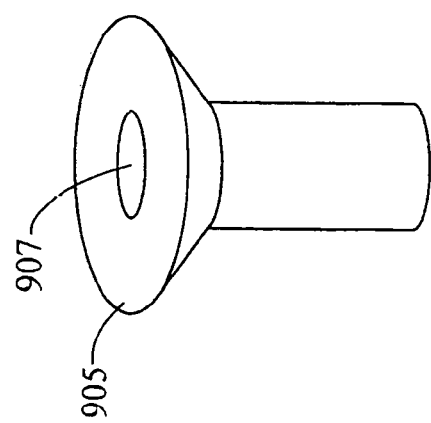

ENGINE STARTER SYSTEM

BACKGROUND

Some electric machines can play important roles in vehicle operation. For example, some vehicles can include a starter, which can, upon a user closing an ignition switch, lead to cranking of engine components of the vehicle. Drive train systems capable of frequent start and stop conditions are becoming a requirement in modern vehicles. Frequent start-stop conditions require the starter to operate in high efficiency in cold engine crank and warm engine crank environments. The demands of frequent start-stop conditions require various components and systems that function more rapidly and more efficiently to increase reliability, reduce energy consumption and enhance the driving experience. The specifications of modern vehicles are also driving the need for drivetrain systems with increasing vehicle engine torque support during starting to aid engine acceleration during the start-up process. Electric machines deploying starters with much higher speed operation have been introduced; however the higher rotational speeds create high centrifugal forces that can cause commutator or armature winding failure. For some electric machines, the torque-speed characteristics need to be modified to reduce undesirable high speed operation while maintaining acceptable crank torque requirements.

SUMMARY

Some embodiments of the invention comprise electric starters that utilize starter motors with much higher speed operation than conventional starters. These high speed starters can have ring gear to pinion gear ratios reaching 10-15:1 in advanced designs with an internal gear ratio of 3.6-5:1. Armature speeds of the starter can reach into the 30,000+ RPM range, and these high speeds can create forces that in turn cause failure of the commutator or armature winding. Increasing vehicle efficiency and reliability demands are driving the need for starting motors that are integrated within electric machine start-stop systems where the starter may be required to provide lifetime operational range of 300,000 to 400,000 start cycles.

Some embodiments of the invention provide a starter that can perform well at high-speeds having low torque demand while also operating well at low speeds having high torque demanded of the starter. In some embodiments, the starter is able to meet the cold crank requirement and function under a warm start scenario while reducing the pinion speed at low pinion torque. Some further embodiments of the invention provide components and systems that are configured and arranged to function to allow better engagement of the starter system with the drivetrain of the vehicle.

Some starters include various magnetic flux assemblies. In some embodiments, the motor includes a main field coil capable of producing a main magnetic flux field, and at least one auxiliary flux assembly configured and arranged to provide a supplemental magnetic field flux. In some embodiments, the auxiliary flux assembly comprises a permanent magnet. In some further embodiments, the permanent magnet comprises a ferrite-based magnetic material, an alnico-based magnetic material, or a neodymium-based magnetic material. In some embodiments, the supplemental magnetic flux provided by the auxiliary flux assembly supplements the excitation provided by the main field flux. In some embodiments, the supplemental magnetic field flux acts to limit, ("trim" or "clip") the pinion speed during high speed and low torque conditions. This enables the high end speed of the motor to be limited, and lowers the top end speed to below a limit known to cause motor damage or reduced duty cycle.

Some embodiments of the invention include an auxiliary flux assembly that includes at least one pole shoe substantially circularly arranged around an inner periphery of a frame of the motor and secured by at least one post or fastener. In some embodiments, the auxiliary flux assembly includes a plastic sleeve at least partially housing at least one permanent magnet. The plastic sleeve may be at least partially housed by at least one pole shoe. In some embodiments, the main field coil comprises a circular conductor wire, whereas in other embodiments, the main field coil comprises a non-circular wire.

Some embodiments provide a starter system including a starter capable of being controlled by an electronic control unit. In some embodiments, the starter comprises a motor at least partially disposed within a frame and coupled to a pinion. In some embodiments, the motor further includes a main field coil capable of producing a main magnetic flux field, and at least one or more auxiliary flux assemblies configured and arranged to provide a supplemental magnetic field flux. In some further embodiments the motor further comprises an armature electromagnetically coupled with the main magnetic field flux and the supplementary magnetic field. In some embodiments, in response to a signal from the electronic control unit, the main field coil can be energized. In some embodiments, once the main field coil is energized, the armature can electromagnetically couple with a magnetic field flux from the main field coil and the auxiliary flux assembly. Finally, some embodiments, in response to a signal from the electronic control unit, the pinion can be actuated to engage with a ring gear of an engine.

DESCRIPTION OF THE DRAWINGS

FIG. 7A shows a top view of a pole shoe with an integrated permanent magnet, in accordance with an aspect of an exemplary embodiment;

FIG. 7B shows a top view of the starter motor illustrating a mounting of the permanent magnet, in accordance with an aspect of an exemplary embodiment;

FIG. 7C shows a side view of the pole shoe of FIG. 7A, in accordance with an aspect of an exemplary embodiment;

FIG. 9A shows a plan view of a plastic sleeve for a permanent magnet, in accordance with an aspect of an exemplary embodiment;

FIG. 9B shows a motor frame including a pole shoe arrangement, in accordance with an aspect of an exemplary embodiment;

FIG. 9C shows a side view of pole shoe in accordance with an aspect of an exemplary embodiment;

DETAILED DESCRIPTION

Figure 1:
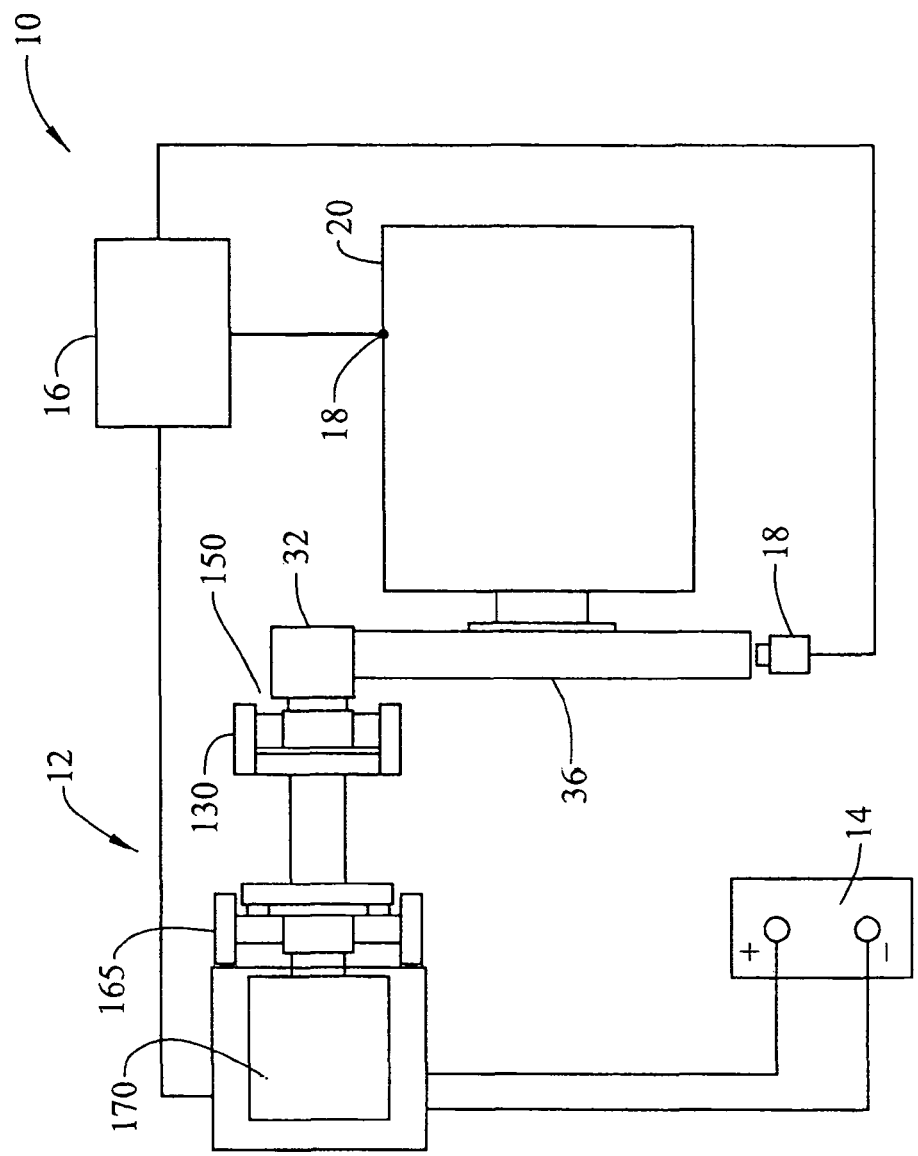
FIG. 1 is a diagram of a starter control system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

The primary functionality for the disclosed starter 12 remains consistent with those that preceded it. However, the disclosed starter 12 must function to start an engine 20 on a much more frequent basis and under a wider variance of conditions. More significantly, while traditional starters 12 are configured to begin rotation of an engine 20 crankshaft that is at complete rest, the disclosed starter 12 may be engaged to start an engine 20 that is already moving. That is, the engine 20 may be in a state where it is not "running" under its own power. The vehicle to which the engine 20 provides power can remain in motion for a time, even after the electronic ignition for the engine 20 is turned off. In other words, the vehicle and engine 20 can be in a state of "coasting".

In an effort to create more fuel efficient vehicles, manufacturers are engineering vehicles that turn their engines off when there is no demand for power from the engine 20 (i.e., the engine 20 would traditionally have been idling). As such, there will likely be situations where the vehicle is in motion and the crankshaft of the engine 20 is turning due to coasting. A primary goal of such systems is to make the start-stop procedure virtually transparent to the operator, and therefore the engine needs to be able to start substantially immediately when required. For example, when the driver of a vehicle stops at a red light, the start-stop control system turns off the ignition thereby shutting down the engine 20. When the light turns green and the driver presses the accelerator pedal, the engine should start substantially immediately, such that forward movement can resume as though the engine had simply remained in an idle state during the stop at the red light. Subtle differences in the conditions at the time of engine 20 startup can affect the performance of the starter 12, and lead to possible start delay. While this delay may be insignificant when starting a vehicle in the morning in order to drive to the workplace (i.e. a cold start), for example; a delay can create problems when a start is required while the vehicle is on a road and in travel, (i.e. a warm start).

Depending on the situation, there may be times when the pinion 150 needs to mesh with the ring gear 36 while the flywheel is still in motion. For example, as the driver approaches a stop a stop sign and puts his foot on the brake, the ignition system will shut down and engine combustion will stop. Several seconds later, the driver may depress the accelerator and the engine 20 restarts. Although the vehicle's forward movement is stopped, the rotation of the flywheel may continue to rotate for several seconds. Therefore, the pinion 150 must engage a moving gear 36 without causing damage to the starter 12, pinion 150, or ring gear 36. In addition, vehicle manufacturers have expressed the desire for greater run-up torque support during engine 20 starting to aid in engine acceleration up until the engine is fully started.

The following discussion, particularly in relation to FIG. 1 and FIG. 2 provides a general overview of a starter 12 and how its features and functionality fit within the electrical and mechanical systems of a vehicle. Practitioners will appreciate that the following discussion is for explanation only, and does not limit the scope of the disclosed starter 12. Moreover, the following explanation does not disclose every configuration of a typical starter 12, recognizing that many such configurations exists. Those of ordinary skill in the art will appreciate that the starter 12 construction and types of materials as disclosed herein may be applicable to many different types and configurations of starters 12, generators, and the like.

FIG. 1 illustrates a starter control system 10 according to one embodiment of the invention. The system 10 can include a starter 12, including a motor 170, a power source 14 such as a battery, an electronic control unit 16, one or more sensors 18 for detection of engine speed, (in this case shown as the detection of ring-gear speed), and an engine 20 such as an internal combustion engine. In some embodiments, the engine speed sensor 18 can communicate with the engine control unit 16 via wired and/or wireless communication protocols. In some embodiments, the system 10 can include a pinion 150 and a pinion coil (shown as 120 in FIG. 2A), wherein the pinion 150 is coupled to the motor 170 via a gear train 165 and a clutch 130. In some embodiments, a vehicle, such as an automobile, can comprise the system 10, although other vehicles can include the system 10. In some embodiments, non-mobile apparatuses, such as stationary engines, can comprise the system 10.

In addition to the conventional engine 20 starting episode (i.e., a "cold start" starting episode), the starter control system 10 can be used in other starting episodes. In some embodiments, the control system 10 can be configured and arranged to enable a "stop-start" starting episode. For example, the control system 10 can start an engine 20 when the engine 20 has already been started (e.g., during a "cold start" starting episode) and the vehicle continues to be in an active state (e.g., operational), but the engine 20 is temporarily inactivated (e.g., the engine 20 has substantially or completely ceased moving at a stop light).

Moreover, in some embodiments, in addition to, or in lieu of being configured and arranged to enable the previously described stop-start starting episode, the control system 10 can be configured and arranged to enable a "change of mind stop-start" starting episode. The control system 10 can start an engine 20 when the engine 20 has already been started by a cold start starting episode and the vehicle continues to be in an active state and the engine 20 has been automatically deactivated, but continues to move (i.e., the engine 20 is coasting). For example, after the engine 20 receives a deactivation signal, but before the engine 20 substantially or completely ceases moving, the user can decide to reactivate the engine 20 (i.e. vehicle operator removes his foot from the brake pedal) so that the pinion 150 engages the ring gear 36 as the ring gear 36 is coasting. After engaging the pinion 150 with the ring gear 36, the motor 170 can restart the engine 20 with the pinion 150 already engaged with the ring gear 36. In some embodiments, the control system 10 can be configured for other starting episodes, such as a conventional "soft start" starting episodes (e.g., the motor 170 is at least partially activated during engagement of the pinion 150 and the ring gear 36).

As previously mentioned, in some embodiments, the control system 10 can be configured and arranged to start the engine 20 during a change of mind stop-start starting episode. In order to reduce the potential risk of damage to the pinion 150, and/or the ring gear 36, a speed of the pinion 150 (the pinion speed multiplied by the ring gear and pinion ratio) can be substantially synchronized with a speed of the ring gear 36 (i.e., a speed of the engine 20) when the starter 12 attempts to engage the pinion 150 with the ring gear 36. The engine control unit 16 can then use at least some portions of the starter control system 10 to restart the engine 20.

Figure 2A:
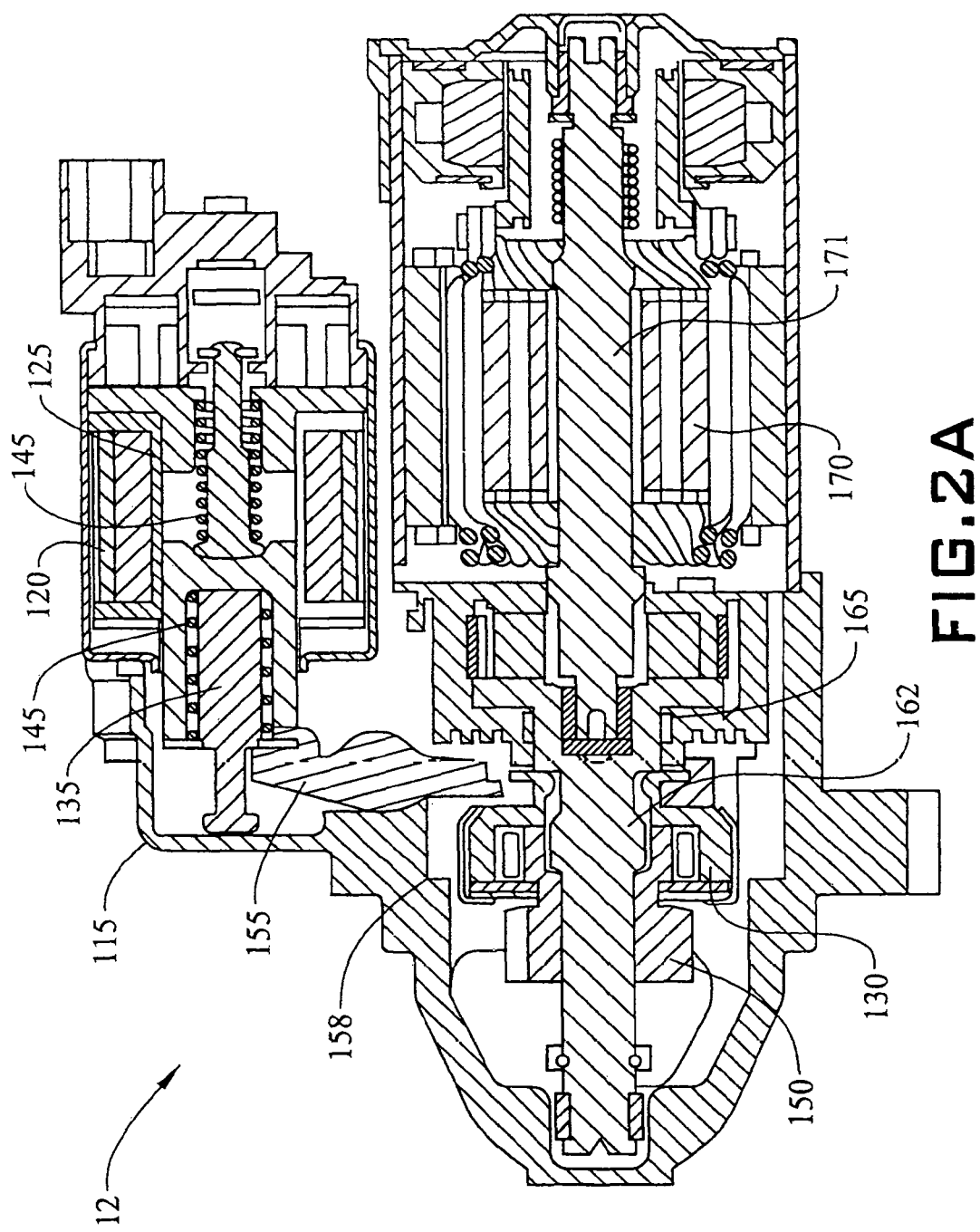
FIG. 2A shows a starter according to one embodiment of the invention.

FIG. 2A is a cross-sectional view of a conventional starter 12 according to one embodiment of the invention. In some embodiments, the starter 12 comprises a housing 115, a motor 170 including a drive shaft 171, a gear train 165, a solenoid assembly 125, a clutch 130 (e.g., an over-running clutch), and a pinion 150. In some embodiments, the starter 12 can operate in a generally conventional manner. For example, in response to a signal (e.g., a user closing a switch, such as an ignition switch), the solenoid assembly 125 can cause a plunger 135 to move the pinion 150 into an engagement position with a ring gear 36 of a crankshaft of a conventional engine (not shown). Further, the signal can lead to the motor 170 generating an electromotive force, which can be translated through the gear train 165 to the pinion 150 engaged with the ring gear 36. As a result, in some embodiments, the pinion 150 can move the ring gear 36, which can crank the engine 20 leading to ignition. Further, in some embodiments, the over-running clutch 130 can aid in reducing a risk of damage to the starter 12 and the motor 170 by disengaging the pinion 150 from a shaft 162 connecting the pinion 150 and the motor 170 (e.g., allowing the pinion 150 to free spin if it is still engaged with the ring gear 36). In some embodiments, the pinion 150 can be directly coupled to a shaft of the motor 170 and can function without a gear train 165.

Figure 2B:
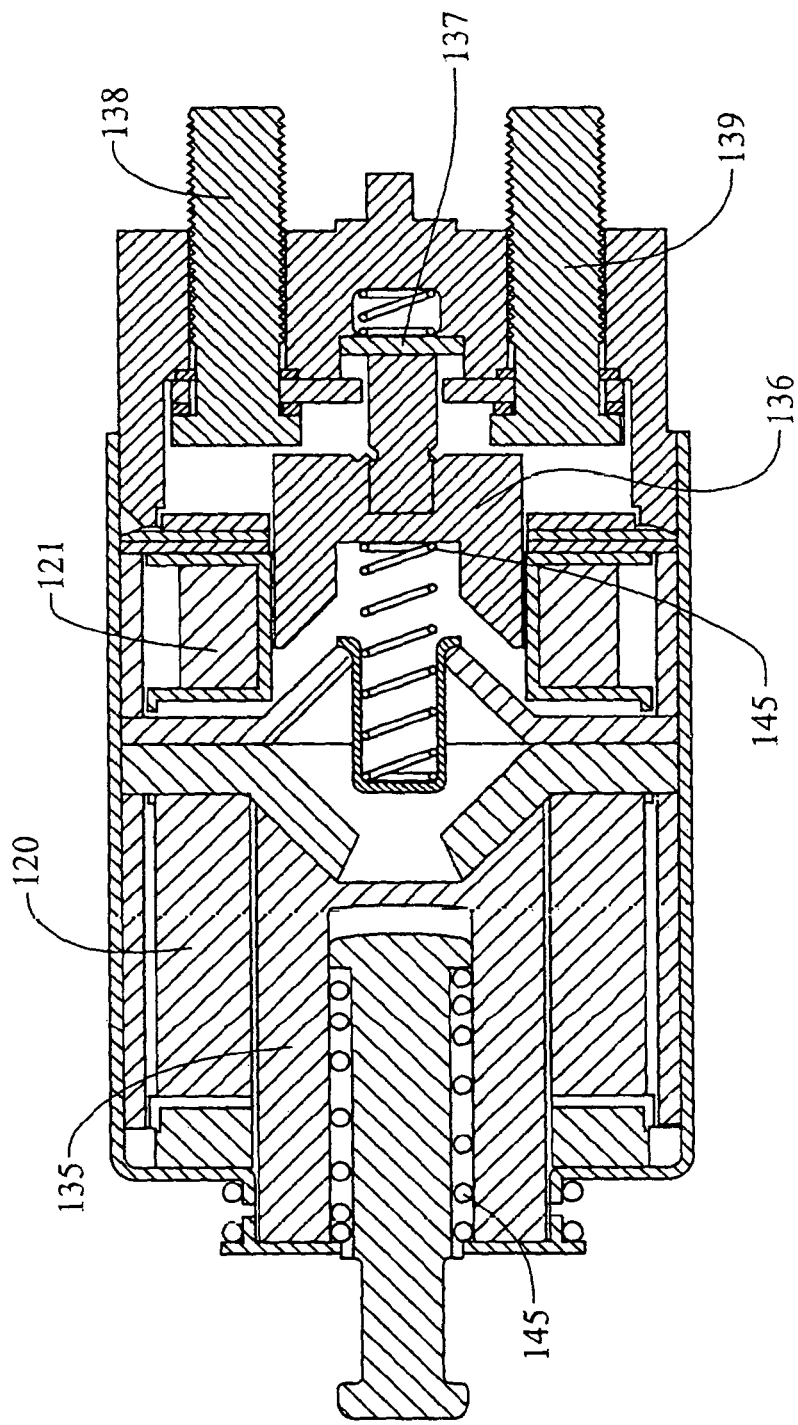
FIG. 2B shows an illustration of a solenoid assembly according to one embodiment of the invention.

In some embodiments, the solenoid assembly 125 that allows for the speed synchronization can comprise one or more configurations. Referring to FIGS. 2A and 2B, in some embodiments, the solenoid assembly 125 can comprise the pinion plunger 135, a pinion coil 120, and a plurality of biasing members 145 (e.g., springs or other structures capable of biasing portions of the solenoid assembly 125), a motor coil 121 and a motor plunger 136. In some embodiments, a first end of a shift lever 155 can be coupled to the pinion plunger 135 and a second end of the shift lever 158 can be coupled to the clutch 130 and/or a drive shaft 162 that can operatively couple together the motor 170 and the pinion 150. As a result, in some embodiments, the activation of the pinion coil 120 causes the pinion plunger 135 to move which is then transferred to the pinion 150 via the shift lever 155, 158 to engage the pinion 150 with the ring gear 36. In the same embodiment, the motor coil 121 is activated to cause the motor plunger 136 to move which closes the switch 137 which sends power from the battery bolt 138 to the motor bolt 139 and finally to the motor 170 to cause the motor to spin. The synchronization process occurs as follows: the motor coil 121 is activated first, and when the pinion and ring gear speeds are synchronized, the pinion coil 120 is activated to engage the pinion 150 with the ring gear Practitioners will appreciate that the ability to provide variable flux within the above described starter 12 would be highly beneficial to the overall performance of the starter 12, especially within a start-stop application. Various solutions have been developed in order to provide variable flux including, for example, the manipulation of the starter 12 windings by magnetically varying the strength of the field coil. Another method includes the positioning of a relay in series with, or in parallel across the series field. As such, when a higher speed is required of the starter 12, a relay may be closed, shorting out a portion of the excitation that is passing through the series field and thereby weakening the excitations. This can be thought of as being similar to executing a gear shift on an engine.

Figure 3:
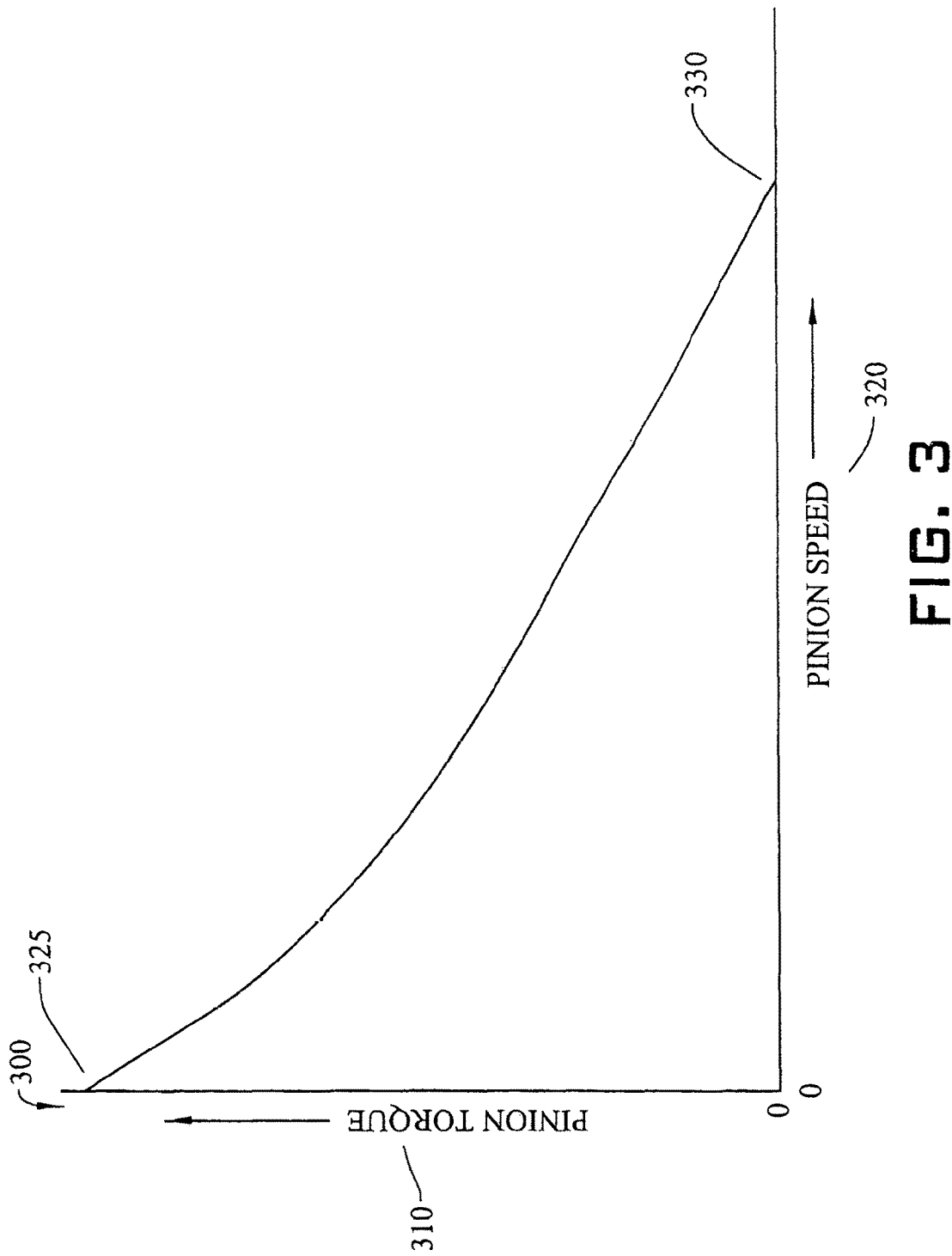
FIG. 3 is a graph showing typical starter pinion torque and speed curve.

FIG. 3 is a graph showing typical starter 12 torque and speed curve. As shown, the starter 12 speed asymptotically reaches its maximum speed limit 330 when the pinion 150 torque is at or substantially near zero. Conversely at or near substantially zero starter 12 speed, the pinion 150 torque is at a maximum 325. Factors influencing the ratio of the pinion 150 torque and pinion 150 speed include the size and mass of the starter 12, and the overall electromagnetic design, (number and type of magnetic coils, internal resistance of the coils).

Figure 4:
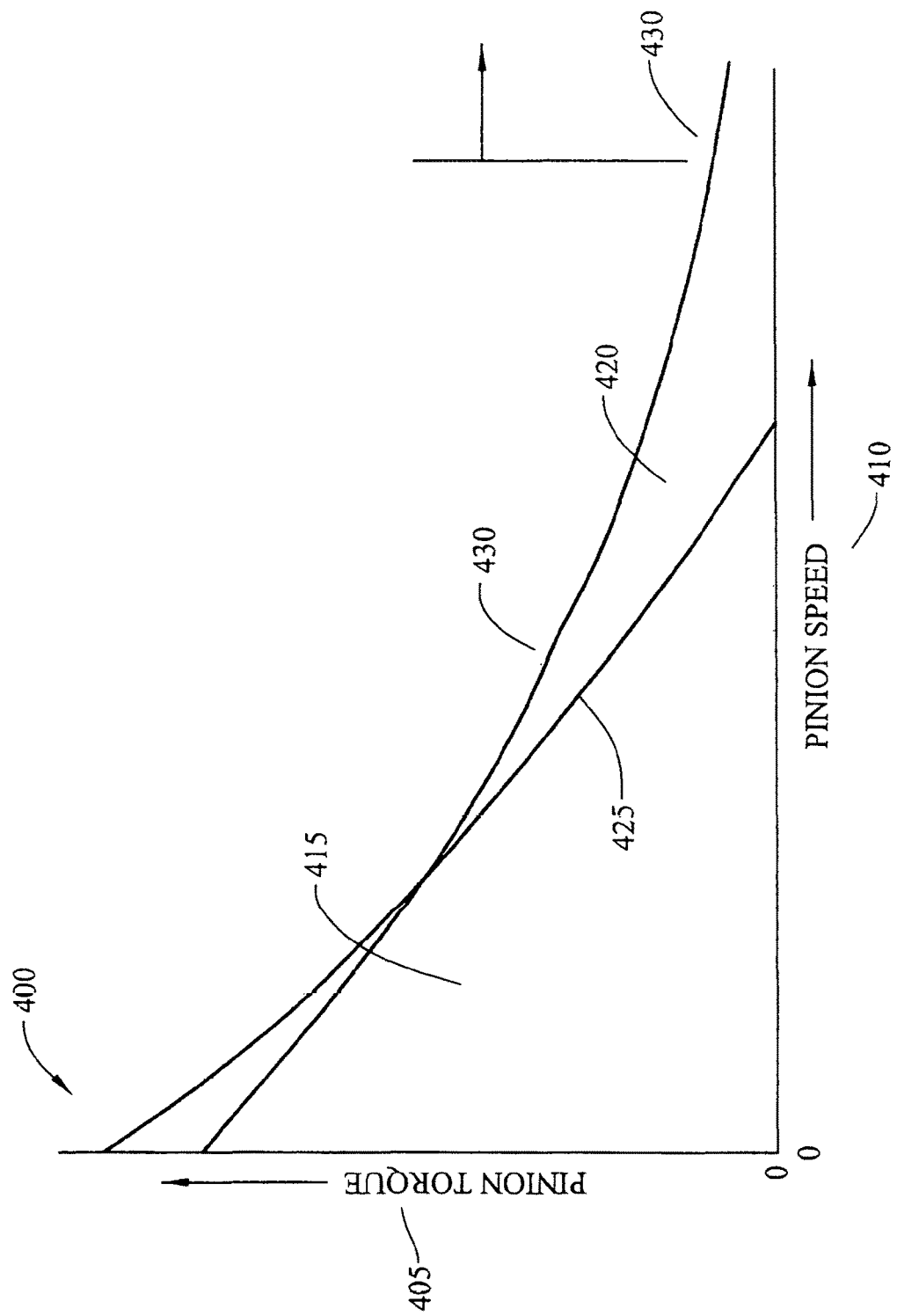
FIG. 4 is a graph showing modeled starter start torque and speed performance and cranking performance for cold and warm start.

FIG. 4 illustrates a graph 400 showing modeled starter 12 for pinion 150 speed (represented as 410) and pinion 150 torque (represented as 405) with cranking performance for cold start (represented as 415) and warm start (represented as 420) starters. The curves shown compare starters that were designed to perform to meet both cold crank and warm crank requirements (represented as curve 430) as compared with a typical starter (represented as curve 425) that is not designed to perform very well in both cold and warm start requirements. In some embodiments as shown, starters that are designed to perform to meet both cold crank and warm crank requirements 430 can have an extended torque range at higher operating speeds.

In a warm start scenario, as is often the situation for the disclosed starter 12, the automobile engine 20 is already warm and its moving parts more freely move with less exertion of energy. For example, when the engine 20 oil is warm, not as much torque is needed for the starter 12 to turn the engine 20, and therefore there is a much faster crank speed from the starter 12. In other words, the engine 20 cranks easier when the engine 20 is warm, requiring less torque from the starter 12. As a result, the starter 12 may crank the engine 20 at a speed that is greater than the warm start requirement, (as illustrated in FIG. 4, warm crank 420). Further still, in order to meet the typical cold crank requirement 415 while also meeting warm crank requirements 420, the conventional approach has been to construct a starter 12 with altered electromagnetic designs, (start motors with reduced conductor count in the armature, or fewer turns in the field coil for example). Although these designs are able to function to meet both cranking environments, they suffer from undesirably high and potentially damaging speeds at low pinion 150 torque. As the motor 170 speed increases past a limit of functional safety, (shown as 430 in FIG. 4), damage may occur to one or more internal components causing degradation of motor 170 performance or sudden failure. Even if the motor 170 does not suffer a catastrophic failure, structural damage may occur that may shorten the lifetime of the motor 170.

Figure 5:
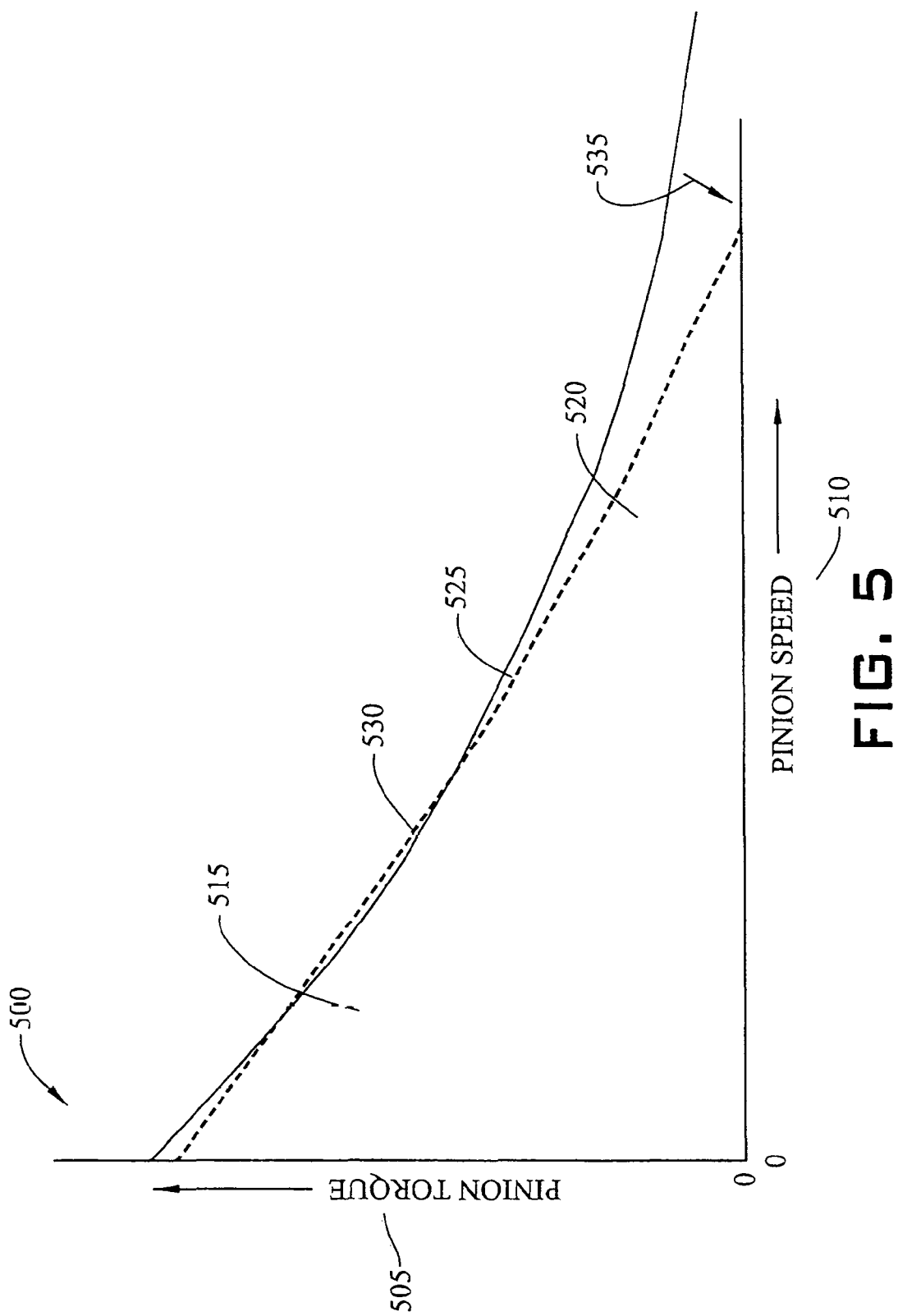
FIG. 5 is a graph showing modeled comparison of starter start torque and speed performance and cold and warm start cranking performance for a conventional design and in the starter according to one embodiment of the invention.

In some embodiments of the invention, the starter 12 is able to meet the cold crank requirement and function under a warm start scenario while reducing the pinion 150 speed at low pinion 150 torque. FIG. 5 is a graph 500 showing modeled comparison of starter 12 start pinion 150 torque 505 and pinion 150 speed 510 performance, with cold and warm start cranking performance for conventional design 525, and in the starter 12 according to one embodiment of the invention, (shown as 530 in FIG. 5). As shown, both the conventional starter 12 and the starter 12 according to one embodiment of the invention meet cold crank 515 and warm crank 520 requirements. However, in some embodiments, changes to the starter 12 design create a speed-limiting supplemental flux that alters the behavior of the pinion 150 speed and torque relationship (see 530 in FIG. 5 as compared to conventional approaches 525 that do not have the improved supplemental torque feature). In some embodiments, this serves to yield performance improvements as evidenced by speed trimming 535 at higher pinion speeds and lower ranges of pinion 150 torque. In other words, the cold start and warm start requirements of improved "start-stop" starters can be met by these new embodiments of the invention without introducing excessive and potentially damaging pinion 150 speeds. As described earlier, this excessive pinion 150 speed is potentially undesirable, and provides no benefit to the starter 12 and vehicle drivetrain as a whole.

Figure 6:
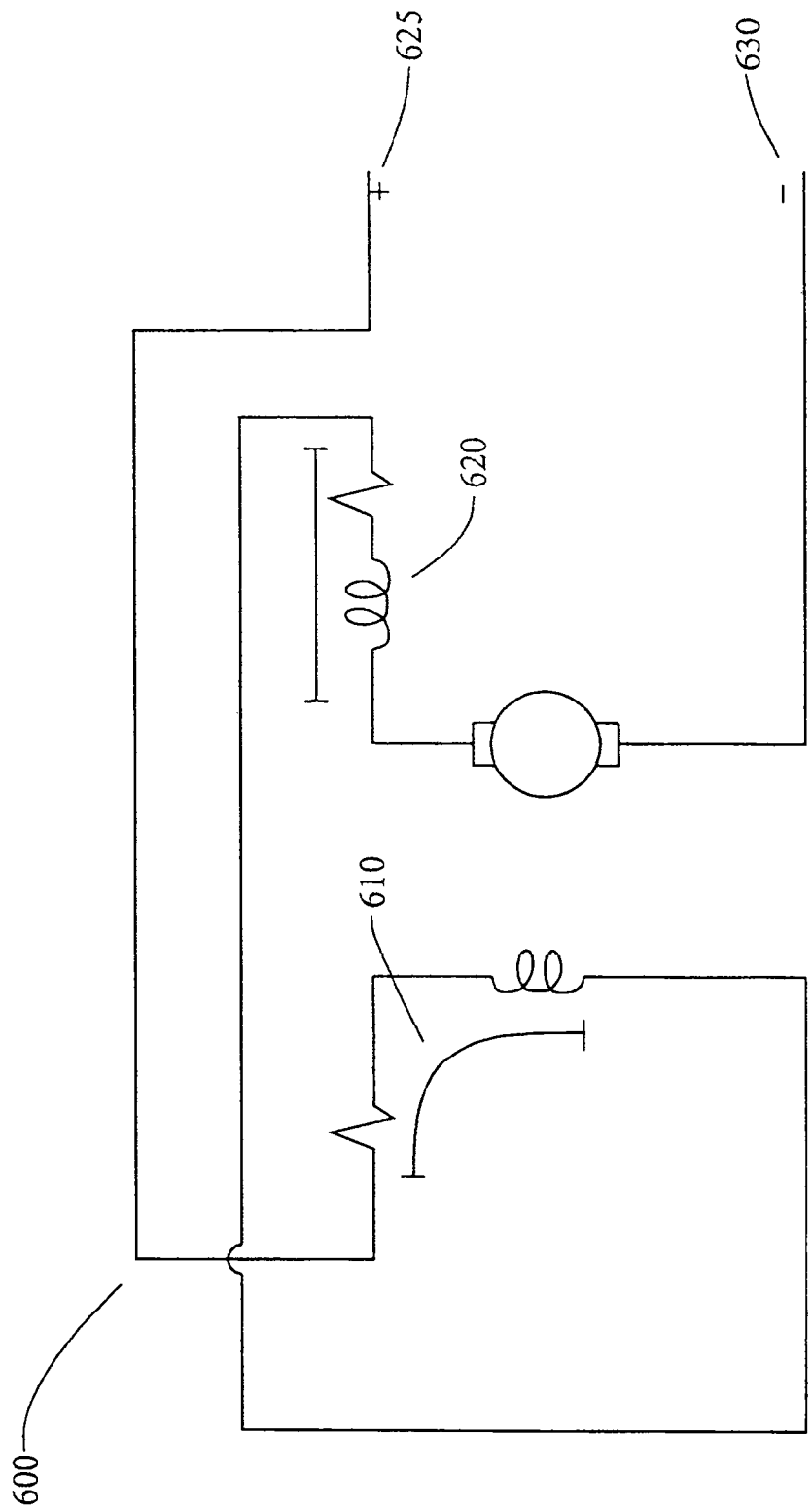
FIG. 6 is a graph showing a conventional starting motor circuit.

FIG. 6 is a graph showing a starting motor circuit 600 used in one or more of the embodiments as disclosed. Within the circuit 600, current passes through the main field coil 610 resulting in lines of a magnetic flux generated around main field coil 610. In some embodiments, the magnetic field flux produced in the field winding of the main field coil 610 interacts with the armature 620. In some embodiments, the torque available at the motor shaft 171 is at least partially dependent on the magnetic field flux emitted by the coil 610 acting on the armature 620. In some other embodiments, an additional magnetic flux can be introduced into the circuit that acts as a supplemental magnetic field flux to the main field flux 650 acting on the armature 620.

In some embodiments, the aforementioned changes to the starter 12 design can create a speed-limiting supplemental flux through the use of an auxiliary flux assembly (shown as 720 in FIG. 7A, FIG. 7B, and FIG. 7C). Some embodiments include one or more auxiliary flux assemblies so as to add at least enough supplemental flux to increase the back EMF of the motor 170 and trim the high speed operation.

In some embodiments, the auxiliary flux assembly 720 comprises one or more permanent magnets 721. In some embodiments, the supplemental magnetic field flux 780 is geometrically located at same location as the main magnetic flux field. In some embodiments, the supplemental magnetic field flux acts to limit, ("trim" or "clip") pinion 150 speed at higher speeds and low torque. In some embodiments, this enables the high end speed of the motor 170 to be limited, and moves the top end speed to below a limit known to cause damage to the motor 170. In some embodiments, the speed of the motor 170 is determined by the point where the back EMF produced by the motor 170 (which is a function of flux and speed of the motor 170) equals the applied voltage to the motor 170 less the resistive drop through the motor 170. The enhancements provided by some of the embodiments as described have minimal impact on the torque-speed curve from stall to the warm crank point. Beyond this point however, there is a significant and desirable impact on the torque-speed curve as it works to "trim" or "clip" the ultra-high speed. In some other embodiments, this is accomplished by adding a small amount of supplemental flux to the high speed operation points so that the balance speed point between the back EMF, (which is a function of speed and flux), and the applied voltage is reached at a lower speed level. This balance point dictates how fast the motor 170 will spin. At higher the speeds, the more impact that a small amount of additional flux will have on the equilibrium point. In some embodiments, the additional flux provided by one or more permanent magnets 721 functions to supplement the excitation provided by the main field. At high speeds, when the field winding flux is low due to the low current in the motor driven by the back-EMF, the small flux addition has a significant impact on the motor 170 speed. The balance speed point between the back-EMF, (which is a function of speed and flux), and the applied voltage is reached at a lower speed level with the auxiliary flux provided by the permanent magnets 721.

For example, some embodiments include at least one auxiliary flux assembly 720 at least partially integrated with a pole shoe 710. As illustrated in FIGS. 7A-7C, some embodiments include a permanent magnet 721 at least partially integrated with a pole shoe 710. Some embodiments include a pole shoe 710 that comprises an iron or steel plate that at least partially encloses one or more of the permanent magnets 721. In some embodiments, the auxiliary flux assembly 720 comprises a ferrite-based magnetic material. In other embodiments; the auxiliary flux assembly 720 comprises a neodymium-based permanent magnet. In some further embodiments, the auxiliary flux assembly 720 comprises an alnico-based magnetic material.

Figure 8B:
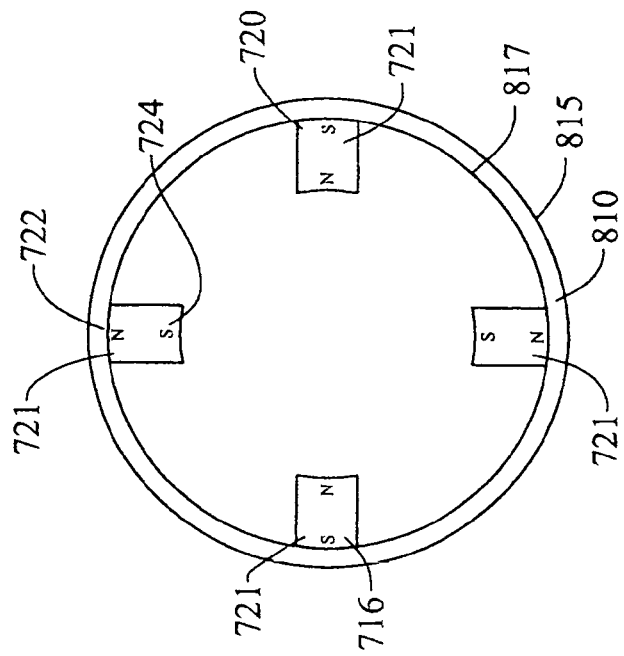
FIG. 8B shows an axial end view of the motor frame of FIG. 8A.
Figure 8A:
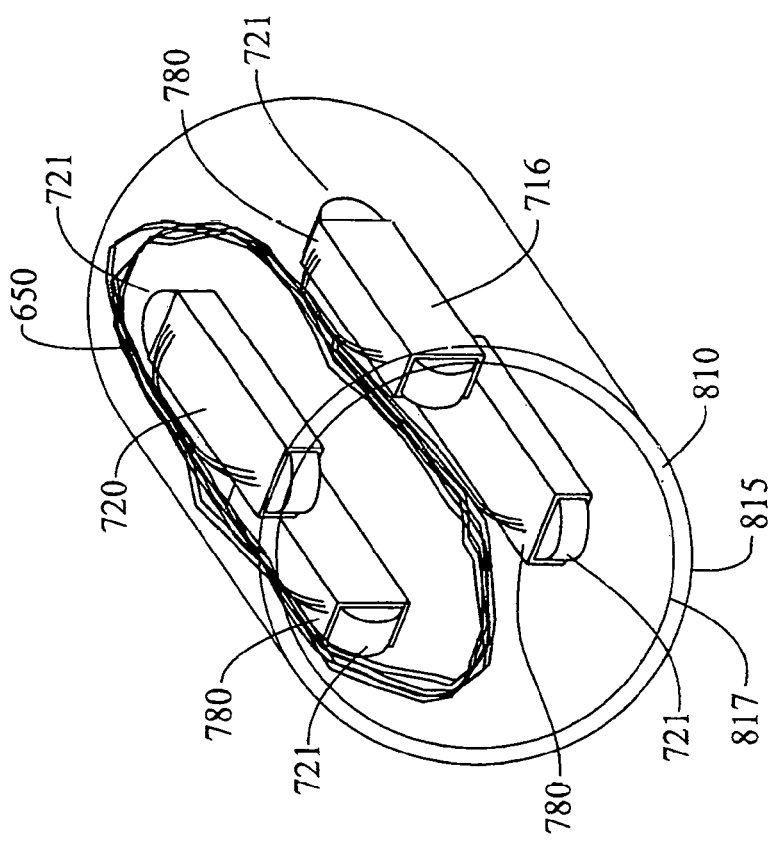
FIG. 8A shows a lower left perspective view of a motor frame having a pole shoe and permanent magnet assembly, in accordance with an aspect of an exemplary embodiment.

In some embodiments, the pole shoe 710 can be mounted within a frame 810 to form a low reluctance path for magnetic flux lines. For example, FIG. 8A and FIG. 8B show one embodiment of an auxiliary flux assembly 720 comprised a pole shoe—permanent magnet 721 assembly configured and arranged within a frame 810. As shown, permanent magnets 721 coupled with pole shoes 710 can be positioned within a frame 810, and positioned circularly and equally spaced arranged around an inner periphery 817 of the frame 810. In some embodiments, the auxiliary flux assembly 720 as shown can provide an auxiliary magnetic field flux supplemental to that produced by main field coil 610.

According to some embodiments, in at least one of the auxiliary flux assemblies, the permanent magnets 721 comprise a magnetically north pole 722 that is positioned substantially adjacent to the frame inner periphery 817 of the frame 810, and a magnetically south pole 724 at the opposite end of the permanent magnet 721. In at least some embodiments, the auxiliary flux assemblies with permanent magnets 721 with opposed poles are arranged alternately around the inner periphery 817 of the frame 810 so that every other permanent magnet 721 has the same axial pole orientation. In some embodiments, this configuration results in an electric machine where no two permanent magnets 721 with identical pole orientations can be positioned substantially directly adjacent to each other around the inner periphery 817 of the frame 810. In other words, each permanent magnet 721 is positioned immediately on the substantially opposite side of the frame 810, aligned so that each magnet is substantially centrally axially positioned 180° from its magnetic polar twin.

Some embodiments provide alternative auxiliary flux assembly 720 configurations and housing architectures. For example, some embodiments may include one or more auxiliary flux assemblies 721 comprising a single permanent magnet 721. In other embodiments, one or more auxiliary flux assemblies 720 may each include a plurality of permanent magnets 721. In some embodiments, a plurality of auxiliary flux assemblies 720 may be distributed substantially equally spaced around the inner periphery 817 of a frame 810.

Some embodiments include other alternative auxiliary flux assembly components and architecture. For example, FIG. 9A, FIG. 9B, and FIG. 9C illustrate a pole shoe—permanent magnet 721 assembly configuration according to one embodiment of the invention. As shown, some embodiments include a pole shoe 710 secured through a frame 810 using one or more posts 713. In some embodiments, following positioning of the pole shoe 710 adjacent to an inner periphery 817 of the frame 810, the one or more posts 713 can be positioned through one or more holes 714 within the frame 810. In some embodiments, any portion of one or more posts 713 extending beyond an outer surface 811 of the frame 810 can be machined substantially flat, in order to at least partially secure the auxiliary flux assembly 720 to the frame 810. Furthermore, as shown, some embodiments of the auxiliary flux assembly 720 include a plastic sleeve 905 including an orifice 907. In some embodiments, a permanent magnet 721 can be substantially positioned within the orifice 907. In some embodiments, the magnet 721 can be positioned within the orifice 907 so that the plastic sleeve 905 at least partially surrounds the permanent magnet 721. In some embodiments, once inserted into the orifice 907 of the sleeve 905, the sleeve 905 can at least partially secure the magnet 721 to at least partially prevent movement.

Figure 10A:
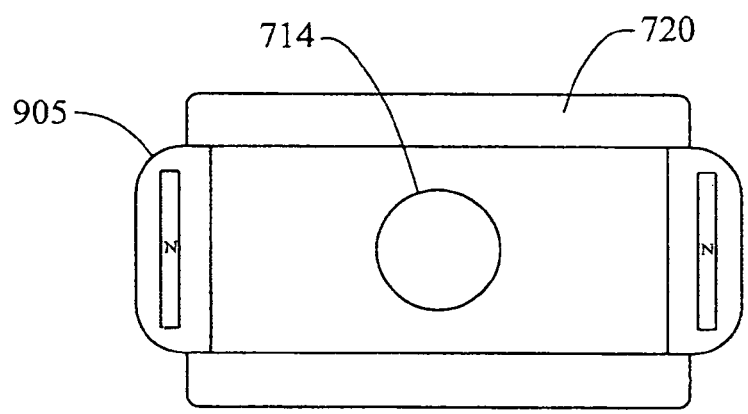
FIG. 10A shows a top view of a permanent magnet assembly, in accordance with an aspect of an exemplary embodiment.
Figure 10B:
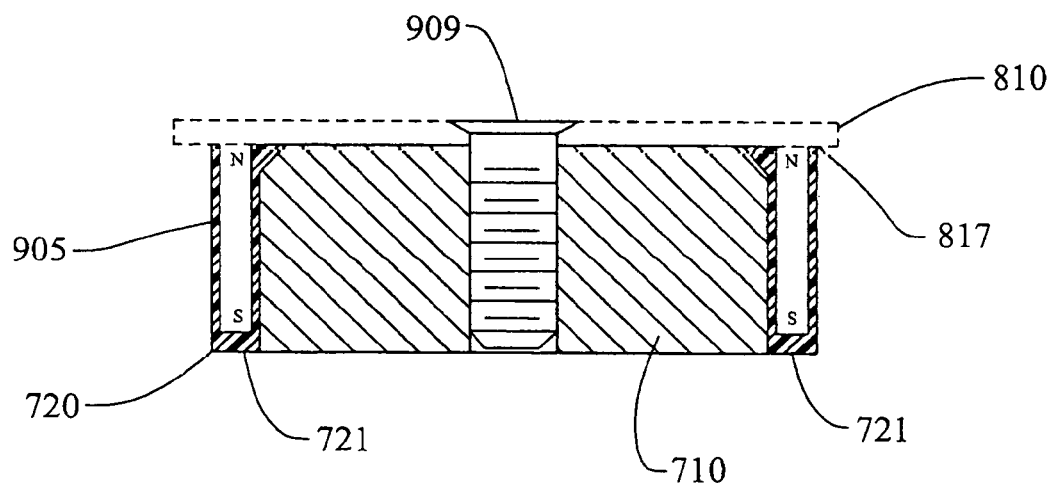
FIG. 10B shows a side view of the permanent magnet assembly of FIG. 10A, in accordance with an aspect of an exemplary embodiment.

Some embodiments include other alternative auxiliary flux assembly components and architectures. For example, FIG. 10A and FIG. 10B illustrate a pole shoe—permanent magnet 721 assembly configuration according to one embodiment of the invention. As shown, some embodiments include a pole shoe 710 secured through a frame 810 using one or more fasteners 909. In some embodiments, following positioning of the pole shoe 710 adjacent to an inner periphery 817 of the frame 810, the one or more fasteners 909 can be positioned through one or more holes 714 within the frame 810. As shown, some embodiments include a plurality of permanent magnets 721 housed within a plurality of plastic sleeves 905.

Figure 11A:
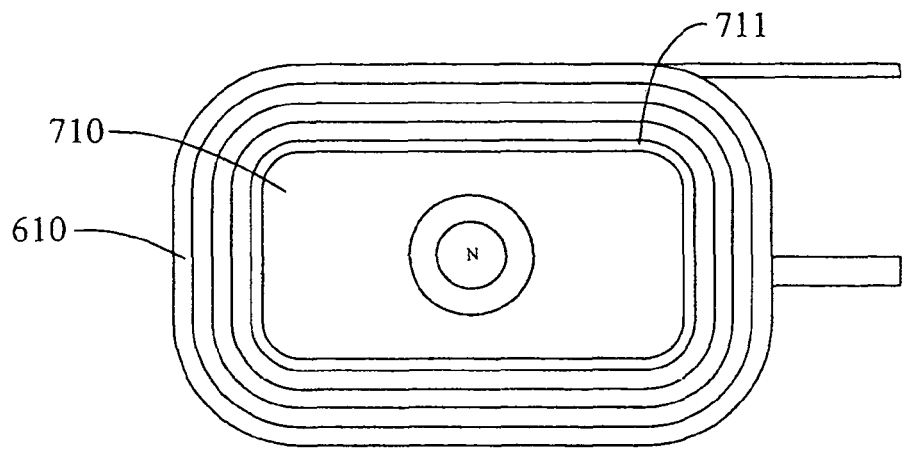
FIG. 11A shows a top view of a permanent magnet ad main filed coil assembly, in accordance with an aspect of an exemplary embodiment.
Figure 11B:
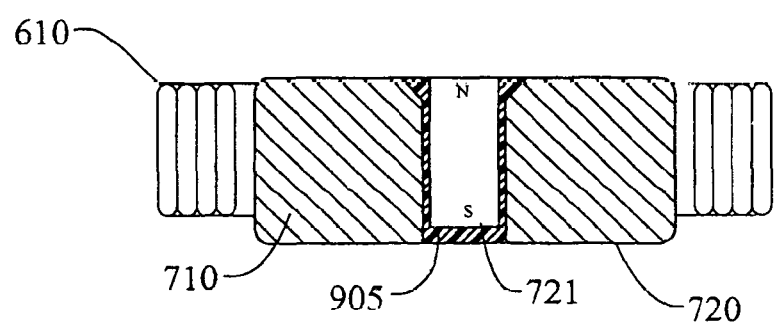
FIG. 11B shows a side view of the permanent magnet and main field coil assembly of FIG. 11A, in accordance with an aspect of an exemplary embodiment.

FIG. 11A and FIG. 11B illustrate a pole shoe—permanent magnet 721 and main field coil 610 assembly according to one embodiment of the invention. As shown, the auxiliary flux assembly 720 includes at least one permanent magnet 721 housed within the sleeve 905 positioned within a pole shoe 710. In some embodiments as shown, the main field coil 610 can at least partially surround the pole shoe 710 substantially adjacent the outer surface of the shoe 710.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:

1. A starter comprising:
   a motor at least partially disposed within a frame and coupled to a pinion, the motor including:
   a main field coil capable of producing a main magnetic flux field;
   at least one auxiliary flux assembly comprising at least one pole shoe having an inner diametric surface and an outer diametric surface and at least one permanent magnet at least partially positioned within and exposed at an inner diametric surface of the at least one pole shoe, wherein the at least one permanent magnet supplements an excitation of the main magnetic flux field with a supplemental magnetic flux field and wherein the at least one pole shoe forms a low reluctance path for the supplemental magnetic flux field,
   the at least one auxiliary flux assembly electrically disconnected from the main field coil and configured and arranged to provide the supplemental magnetic flux field at substantially the same location as the main magnetic flux field; and
   an armature electromagnetically coupled with the main magnetic flux field and the supplementary magnetic flux field.

2. The starter machine of claim 1, wherein the at least one permanent magnet comprises at least one of a ferrite-based magnetic material, an alnico-based magnetic material, and a neodymium-based magnetic material.

3. The starter of claim 1, wherein the at least one pole shoe includes a plurality of pole shoes substantially circularly arranged around an inner periphery of the frame, the at least one pole shoes-assembly configured and arranged to at least partially support the main field coil; and
   wherein the at least one auxiliary flux assembly is supported by the inner periphery of the frame.

4. The starter of claim 3, wherein the at least one pole shoe is secured to the frame using at least one post.

5. The starter of claim 3, wherein the auxiliary flux assembly includes a plastic sleeve at least partially housing at least one permanent magnet; and wherein the plastic sleeve is at least partially housed by the at least one pole shoe.

6. The starter of claim 5, wherein the at least one pole shoe is secured to the frame using at least one fastener.

7. The starter of claim 5, wherein an outer surface of the at least one pole shoe is at least partially surrounded by the main field coil.

8. The starter of claim 7, wherein the main field coil comprises a noncircular conductor wire.

9. The starter of claim 7, wherein the main field coil comprises a circular conductor wire.

10. The starter of claim 3, wherein the at least one permanent magnet comprises a magnetically north pole positioned substantially adjacent to the inner periphery of the frame.

11. The starter of claim 1, wherein the at least one permanent magnet is exposed at the outer diametric surface of the at least one pole shoe.

12. The starter of claim 11, wherein the at least one permanent magnet touches the frame.

13. The starter of claim 1, wherein the at least one permanent magnet is housed within a sleeve.

14. The starter system according to claim 1, wherein the at least one permanent magnet is exposed at the outer diametric surface of the at least one pole shoe.

15. The starter system according to claim 14, wherein the at least one permanent magnet contacts the frame.

16. A starter system comprising:
a starter capable of being controlled by an electronic control unit, the starter further comprising:
a main field coil capable of producing a main magnetic flux field;
a motor including a drive shaft coupled to a pinion and being at least partially disposed within a frame, the motor further including:
at least one auxiliary flux assembly comprising at least one pole shoe having an outer diametric surface and an inner diametric surface and at least one permanent magnet at least partially positioned through and exposed at the inner diametric surface of the at least one pole shoe, wherein the at least one permanent magnet supplements an excitation of the main magnetic flux field with a supplemental magnetic flux field, and wherein the at least one pole shoe forms a low reluctance path for the supplemental magnetic flux field,
the at least one auxiliary flux assembly electrically disconnected from the main field coil and configured and arranged to provide the supplemental magnetic flux field geometrically located at substantially the same location as the main magnetic flux field; and
an armature electromagnetically coupled with the main magnetic flux field and the supplementary magnetic flux field; and
wherein in response to a signal from the electronic control unit, the pinion can be actuated to engage with a ring gear of an engine.

17. The starter system of claim 16, wherein a current flow through the main field coil is enabled by a signal from the electronic control unit.

18. The starter system of claim 17, wherein the field strength of the supplemental magnetic flux field is less than the field strength of the main magnetic flux field.

19. The starter system of claim 16, wherein the at least one pole shoe includes a plurality of pole shoes substantially circularly arranged around an inner periphery of the frame, the at least one pole shoes-assembly configured and arranged to at least partially support the main field coil; and
wherein the at least one auxiliary flux assembly is supported by the inner periphery of the frame.

20. The starter system of claim 19, wherein the at least one pole shoe is secured to the frame using at least one post.

21. The starter system of claim 19, wherein the auxiliary flux assembly includes a plastic sleeve at least partially housing the at least one permanent magnet;
and wherein the plastic sleeve is at least partially housed by the at least one pole shoe.

22. The starter system of claim 21, wherein the at least one pole shoe is secured to the frame using at least one fastener.

23. The starter system of claim 21, wherein an outer surface of the at least one pole shoe is at least partially surrounded by the main field coil.

24. The starter system of claim 23, wherein the main field coil comprises a non-circular conductor wire.

25. The starter system of claim 23, wherein the main field coil comprises a circular conductor wire.

* * * * *